(12) United States Patent
Hostetter et al.

(10) Patent No.: US 11,163,685 B2
(45) Date of Patent: Nov. 2, 2021

(54) TARGET AND INITIATOR MODE CONFIGURATION OF TAPE DRIVES FOR DATA TRANSFER BETWEEN SOURCE AND DESTINATION TAPE DRIVES

(71) Applicant: Oracle International Corporation, Redwood City, CA (US)

(72) Inventors: David G. Hostetter, Louisville, CO (US); Steven Sanders, Golden, CO (US)

(73) Assignee: Oracle International Corporation, Redwood City, CA (US)

( * ) Notice: Subject to any disclaimer, the term of this patent is extended or adjusted under 35 U.S.C. 154(b) by 1718 days.

(21) Appl. No.: 14/921,054

(22) Filed: Oct. 23, 2015

(65) Prior Publication Data

US 2016/0041915 A1  Feb. 11, 2016

Related U.S. Application Data

(62) Division of application No. 14/331,355, filed on Jul. 15, 2014, now Pat. No. 9,195,402.

(51) Int. Cl.
*G06F 12/08* (2016.01)
*G11B 5/008* (2006.01)
(Continued)

(52) U.S. Cl.
CPC .......... *G06F 12/0868* (2013.01); *G06F 3/061* (2013.01); *G06F 3/0647* (2013.01); *G06F 3/0686* (2013.01); *G11B 5/00813* (2013.01); *G06F 3/0682* (2013.01); *G06F 2212/154* (2013.01); *G06F 2212/163* (2013.01); *G06F 2212/213* (2013.01); *G06F 2212/254* (2013.01); *G06F 2212/264* (2013.01)

(58) Field of Classification Search
CPC .............. G11B 15/6835; G11B 15/689; G11B 2020/10833; G11B 2020/10842; G11B 2020/10527; G11B 2020/1201; G11B 2020/1803; G11B 2220/90; G11B 27/002; G11B 27/024; G11B 27/032; G11B 5/86; G11B 5/00813; G06F 3/0686; G06F 3/067; G06F 3/0682; G06F 3/0683; G06F 12/0866; G06F 12/0868; G06F 2003/0698;
(Continued)

(56) References Cited

U.S. PATENT DOCUMENTS 7,421,520 B2   9/2008  Wilkins et al.
8,681,788 B2   3/2014  Brahmaroutu et al.
(Continued)

*Primary Examiner* — Philip J Chea
*Assistant Examiner* — Ruth Solomon
(74) *Attorney, Agent, or Firm* — Snell & Wilmer LLP; Kent A. Lembke

(57) ABSTRACT

Systems and methods that substantially or fully remove a commanding server from a data path (e.g., as part of a data migration, disaster recovery, and/or the like) to improve data movement performance and make additional bandwidth available for other system processes and the like. Broadly, a network interface card (e.g., host bus adapter (HBA)) of a tape drive may be configured in both a target mode to allow the tape drive to be a recipient of control commands from a server to request and/or otherwise obtain data from one or more source tape drives, and in an initiator mode to allow the tape drive to send commands to the one or more tape drives specified in the commands received from the server to request/read data from and/or write data to such one or more tape drives.

8 Claims, 13 Drawing Sheets

(51) Int. Cl.
*G06F 12/0868* (2016.01)
*G06F 3/06* (2006.01)

(58) Field of Classification Search
CPC ......... G06F 2212/154; G06F 2212/163; G06F 2212/213; G06F 2212/254; G06F 2212/264; G06F 3/061; G06F 3/0647
USPC ..... 711/111, 4, 118, 113, E12.019, 202, 100
See application file for complete search history.

(56) References Cited

U.S. PATENT DOCUMENTS

| | | |
|---|---|---|
| 8,990,153 B2 | 3/2015 | Wayda et al. |
| 9,152,352 B1* | 10/2015 | Fair ........................ G06F 3/0686 |
| 9,548,888 B1* | 1/2017 | Fair ..................... H04L 41/0893 |
| 2006/0080507 A1 | 4/2006 | Tyndall et al. |
| 2009/0049310 A1* | 2/2009 | Carlson ............ G11B 20/00086 713/193 |
| 2009/0100223 A1 | 4/2009 | Murayama et al. |
| 2012/0226876 A1* | 9/2012 | Kawaguchi ........... G06F 3/0604 711/162 |
| 2012/0271888 A1* | 10/2012 | Haustein ............... G06F 3/0608 709/204 |
| 2014/0149536 A1* | 5/2014 | Patnaik ............... H04L 67/1097 709/214 |
| 2015/0036236 A1* | 2/2015 | McCarty .......... G11B 20/00007 360/39 |
| 2015/0269039 A1* | 9/2015 | Akirav ................ G06F 11/2007 714/4.11 |

* cited by examiner

TARGET AND INITIATOR MODE CONFIGURATION OF TAPE DRIVES FOR DATA TRANSFER BETWEEN SOURCE AND DESTINATION TAPE DRIVES

CROSS REFERENCE TO RELATED APPLICATION

This application is a divisional of U.S. patent application Ser. No. 14/331,355, entitled "TARGET AND INITIATOR MODE CONFIGURATION OF TAPE DRIVES FOR DATA TRANSFER BETWEEN SOURCE AND DESTINATION TAPE DRIVES," and filed on Jul. 15, 2014, the entire contents of which are incorporated herein by references as if set forth in full.

BACKGROUND

1. Field of the Invention

The present invention generally relates to data transfer or migration between source and destination storage drives and, more particularly, to manners of transferring or migrating data between source and destination storage drives with reduced network bandwidth requirements.

2. Relevant Background

Long term data storage has traditionally involved use of one or more storage tiers of tape drives due to the favorable unit cost and long archival stability of magnetic tape. For example, tape libraries typically store and index a plurality of tape cartridges and include a specialized robotic mechanism that appropriately moves requested tape cartridges between storage locations and tape drives as well as between tape drives. A library manager implemented on a server in communication with the tape library administers data requests within the tape library.

Users often desire to move (e.g., migrate) and/or copy data from tape cartridges of one or more tape drives to tape cartridges of one or more other tape drives for a number of reasons. As an example, an enterprise may desire to maintain off-site copies of all (e.g., or at least critical) enterprise data as part of any appropriate disaster recovery protocols or the like. For instance, any such enterprise data may be replicated (e.g., copied) from tape cartridges of one or more tape drives at a production site to tape cartridges of one or more tape drives at a disaster recovery site (e.g., geographically remote from the production site). As another example, users often desire to move their data from older tape cartridges on older tape drive technology to newer tape cartridges on newer tape drive technology.

SUMMARY

Movement of data between tape cartridges on different tape drives is often a laborious and time-consuming process (e.g., especially for users customers with large data archives). While some data storage applications have implemented data migration methods, most or all of these methods involve reading source data into a cache memory or disk system of a host server prior to writing the data to the new tape technology which commonly creates bandwidth concerns. More specifically, existing manners of data movement or migration between tape drives typically involve a host application running on a server sending (e.g., via Fibre Channel (FC)) any appropriate commands to a source tape drive to retrieve and return, to the server, particular data stored on a tape cartridge of the source tape drive (e.g., one or more particular blocks of the tape).

In this regard, the server operates in an "initiator" mode by sending the commands to the source tape drive while the source tape drive operates in a "target" mode by receiving commands from the server and returning requested data to the server. After reading the requested data from the source tape drive into cache memory or a disk drive system, the server writes the data to one or more tape cartridges on one more "destination" tape drives. Movement of the data from the source tape drive(s) to the cache memory or disk drive system associated with the server and then back to the destination tape drive(s) consumes bandwidth that in turn reduces bandwidth available for other system processes and the like.

In view of the foregoing, disclosed herein are utilities (e.g., methods, systems, and the like) that substantially or fully remove a controlling or commanding server from a data path (e.g., as part of a data migration, disaster recovery, and/or the like) to improve data movement performance and make additional bandwidth available for other system processes and the like. Broadly, the disclosed utilities include the configuration of a tape drive in both a target mode to allow the tape drive to be a recipient of control commands from a server to request and/or otherwise obtain data from one or more source tape drives, and in an initiator mode to allow the tape drive to send control commands to the one or more other tape drives specified in the control commands received from the server (e.g., to request/read data from and/or write data to such one or more tape drives). Upon reading the data, the tape drive may then store the same on one or more tape cartridges in the event the tape drive is the destination tape drive specified in the commands received from the server. In the case where one or more destination drives are different than the tape drive operating in target and initiator mode (i.e., different than the "initiating" tape drive), the tape drive may proceed to temporarily store the data read from the source drive(s) in any appropriate cache memory or the like of the tape drive and then send the same to the one or more destination drives for storage on one or more tape cartridges of such one or more destination drives.

By at least partially separating the control paths and data paths and making use of what may otherwise be underutilized processing bandwidth on the tape drive, resources of the server (e.g., storage, server cycles, etc.) may be made available for other system processes and overall system performance may be improved. Furthermore, the disclosed utilities may allow for increased rates of data transfer between source and destination tape drives as compared to previous data transfer arrangements whereby the source data was read onto cache memory of a controlling server and then written by the controlling server from the cache memory to the destination tape drive(s). For instance, assume a host server is configured to read and write data at a first data transfer rate and that a first tape drive is configured to read and write data at a second data transfer rate greater than the first data transfer rate. In the event that data transfer rates of the second and/or additional tape drives to and/or from which the first tape drive will be writing and/or reading data are higher than that of the host server, then the disclosed utilities may be able to achieve higher data transfer rates than those achieved by the host server (e.g., up to the lower of the data transfer rate of the first tape drive or the data transfer rates of the second/additional tape drives). Even in the case where the data transfer rates of the second/additional tape drives are equal to or lower than that of the host server, efficiencies over previous data transfer arrangements may be achieved by offloading processor cycles from the host server to the first tape drive.

In one aspect, a method for use in moving data from at least one source drive to at least one destination drive over at least one network is disclosed. The method includes receiving, at a first tape drive, a first command to read data from at least one source tape drive; obtaining, at the first tape drive, the data identified in the first command from the at least one source tape drive; and facilitating, by a processor of the first tape drive, storage of the obtained data on at least one destination tape drive identified in the first command.

In one arrangement, the at least one source tape drive is a second tape drive and the obtaining step includes sending, by the processor of the first tape drive over at least one network, a second command to the second tape drive to return data identified in the first command. For instance, the at least one destination tape drive is the first tape drive and the facilitating step may include storing the returned data on the first tape drive. As another example, the at least one destination tape drive may be a third tape drive and the obtaining and facilitating steps may respectively include sending, by the processor of the first tape drive over at least one network, a second command to the second tape drive to return data identified in the first command; and sending, by the processor of the first tape drive over at least one network, the returned data to the third tape drive. In another arrangement, the at least one source tape may be the first tape drive, the at least one destination tape drive may be a second tape drive, and the facilitating step may include sending, by the processor of the first tape drive over at least one network, the data identified in the first command to the second tape drive.

In another aspect, a method for use in moving data from at least one source tape drive to at least one destination tape drive over at least one network includes receiving, at a first tape drive from a server, a first command to read data from at least one source tape drive identified by a first identifier and facilitate storage of the data identified in the first command on at least one destination tape drive identified by a second identifier; initiating, by the first tape drive over at least one network, a discovery routine to discover a plurality of identifiers that respectively identify a plurality of devices in communication with the first tape drive over the at least one network; building, by a processor of the first tape drive, a database of the plurality of discovered identifiers; determining whether at least one of the first or second identifiers is present in the plurality of discovered identifiers; using one of the first or second identifiers to facilitate movement of the data identified in the first command from the at least one source tape drive to the at least one destination tape drive responsive to one of the first or second identifiers being determined to be present in the plurality of discovered identifiers; and sending a communication to the server responsive to one of the first or second identifiers not being determined to be present in the plurality of discovered identifiers.

In a further aspect, a tape drive includes a housing; a network interface controller (NIC) disposed within the housing and including at least one port configured in a target mode to receive first commands from a server over at least one network and at least one port (e.g., either the same as or different than the at least one port configured in target mode) configured in an initiator mode to send second commands to other tape drives over at least one network; and a processor associated within the housing that receives the first commands from the server and generates the second commands based on information in the first commands.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Disclosed herein are utilities that substantially or fully remove a data transfer commanding or controlling server from a data transfer path (e.g., as part of a data migration, disaster recovery, and/or the like) to improve data transfer performance and make additional bandwidth available for other system processes and the like. Broadly, the disclosed utilities include the configuration of a first tape drive in both target mode to allow the first tape drive to be a recipient of control commands from a server to request and/or otherwise obtain data from one or more source tape drives (e.g., which may be the first tape drive or one or more additional tape drives), and in an initiator mode to allow the first tape drive to send read and/or write commands to one or more other tape drives specified in the commands received from the server.

In the event the first tape drive is the source tape drive, the first tape drive may obtain and then send a write command to the one or more other tape drives to write the data identified in the command received from the server to the one or more other tape drives. In the event that first tape drive is the destination tape drive specified in the commands received from the server, the first tape drive may send commands to the one or more other tape drives to return the data identified in the command received from the server and then store the same on one or more tape cartridges of the first tape drive. In the case where the first tape drive is not one of the source or destination tape drives, the first tape drive may both read the identified data from the one or more source tape drives and then write the read data to the one or more destination tape drives. By at least partially separating the control paths and data paths and making use of what may otherwise be underutilized processing bandwidth on the tape drive, resources of the server (e.g., storage, server cycles, etc.) may be made available for other system processes and overall system performance may be improved. Furthermore, the disclosed utilities may allow for increased rates of data transfer between source and destination tape drives as compared to previous data transfer arrangements whereby the source data was read onto cache memory of a controlling server and then written by the controlling server from the cache memory to the destination tape drive(s).

Figure 1:
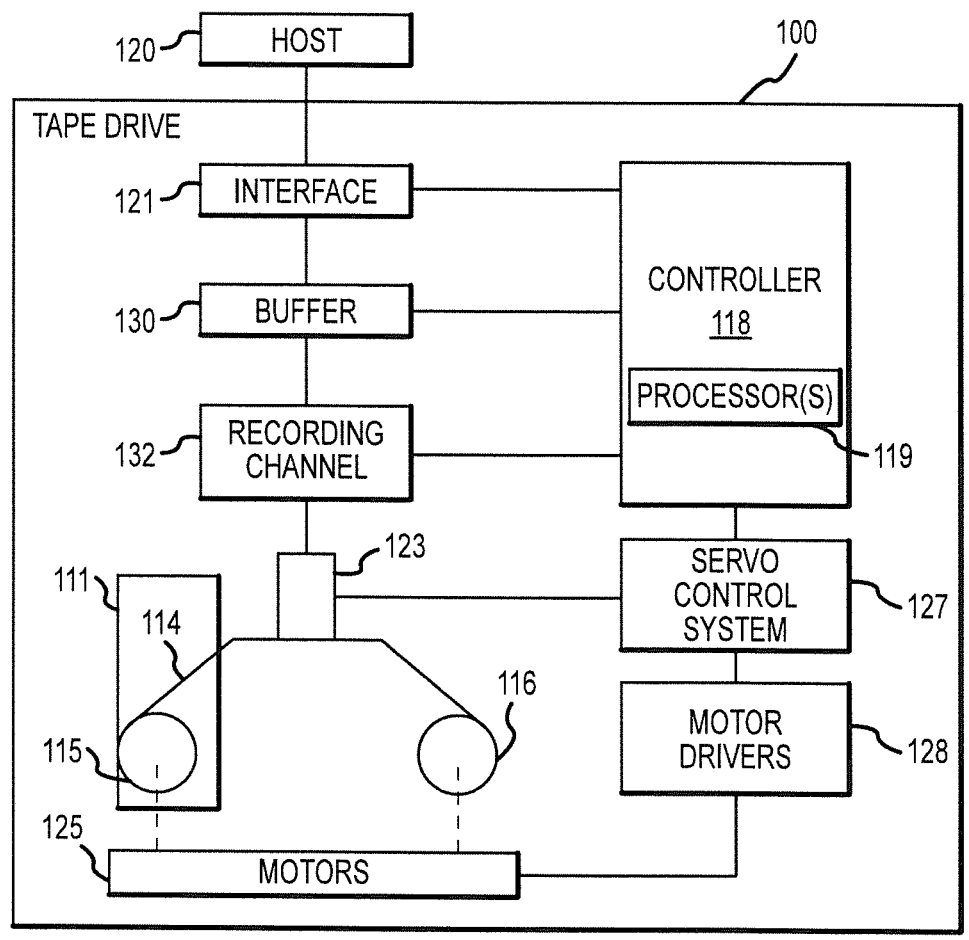
FIG. 1 is a schematic diagram of a tape drive that may be incorporated into the utilities disclosed herein.

Before discussing the data transfer techniques disclosed herein in more detail, it may be useful to disclose one representative tape drive 100 that may form one or more of the source, destination and/or initiating tape drives disclosed herein (while it is to be understood, however, that numerous other such tape drives are envisioned and encompassed herein). In this regard, FIG. 1 presents a schematic view of the tape drive 100 that is configured to receive a magnetic tape cartridge 111 including a length of magnetic tape 114 (e.g., magnetic tape pack, magnetic tape media) wound on at least one reel 115. One or more controllers 118 (e.g., including one or more processing units or processors 119) of a recording system may be included for operating the tape drive 100 in accordance with commands received from a host system 120 (e.g., including a commanding or controlling server) received at an interface 121 (e.g., an NIC including a plurality of network ports). The tape drive 100 may be coupled to the host system 120 in a number of manners such as directly, through a library, or over a network (e.g., via Small Computer Systems Interface (SCSI), Fibre Channel Interface, and the like). The tape drive 100 may be a standalone unit or form part of a tape library or other subsystem.

The magnetic tape cartridge 111 may be inserted into the tape drive 100 and loaded by the tape drive 100 so that the tape 114 winds around a reel 116 of the tape drive 100 (e.g., in addition to one or more rollers or the like) and so that at least one head positioning assembly (HPA) 23 (e.g., tape head assembly) of the recording system reads and/or writes information with respect to the magnetic tape 114 as the tape 114 is moved longitudinally in first/forward and/or second/reverse opposed directions by one or more motors 125 past the HPA 123. For instance, the HPA 123 may include one or more heads, where each head includes a series of servo, read, and/or write elements (e.g., transducers). The recording system may include a servo control or tracking system 127 to electronically switch from one head to another head, to seek and move the heads laterally relative to the tape 114, to position the heads at a desired location over the tape 114 and/or one or more tracks of the tape 114, to follow one or more desired tracks, and/or the like. The various components of the tape drive 110 may be incorporated or otherwise embodied within any appropriate housing (not shown). The servo control system 127 may also control the operation of the motors 125 through motor drivers 128 in response to instructions by the one or more controllers 118, where the controllers 118 may provide the data flow and formatting of data to be read from and written to the magnetic tape 114 (e.g., via employing a buffer/cache 130 and a recording channel 132).

As discussed previously, existing manners of data transfer between source and destination tape drives include an intermediate step of routing the data to be transferred from the source tape drive(s) to a cache memory of the controlling host server and then routing the data from the cache memory of the controlling server to the destination tape drive(s). This arrangement utilizes bandwidth (e.g., processor cycles, storage, etc.) of the host server that may otherwise be more effectively consumed by other system processes and can result in reduced data transfer rates. In this regard, and turning now to FIG. 2, a schematic diagram of a system 200 is illustrated that utilizes an "initiating" or a "first" tape drive 204 (e.g., tape drive 100 of FIG. 1) to facilitate data transfer between source and destination tape drives based on commands received from a host 208 and thereby remove the host 208 from the data path of the data transfer (e.g., at least with respect to data moving from one or more source tape drives to one or more destination tape drives).

The first tape drive 204 may broadly include a housing 212, one or more processing units or processors 216 (e.g., processor(s) 119 of FIG. 1) appropriately disposed within or otherwise associated with the housing 212, storage 220 including one or more tape cartridges 224 (e.g., tape cartridge 111 including tape 114 of FIG. 1), any appropriate memory 228 including cache/buffer 232 appropriately disposed within or otherwise associated with the housing 212, and an NIC 236 disposed within the housing 212 for facilitating the transfer of commands and data between the first tape drive 204 and other devices (e.g., host 208, other tape drives 240, etc.) over one or more networks (e.g., including one or more local area networks, wide area networks, switches, the Internet, etc.). In the case where the first tape drive 204 communicates with the other devices over a Fibre Channel (FC) network, for instance, the NIC 236 may be a FC Host Bus Adapter (HBA) (e.g., FC interface card) while the other devices may be any appropriate FC-capable devices (e.g., also having NICs such as FC HBAs or the like).

Each NIC of each device (e.g., the NIC 236 of the first tape drive 204, the NICs of each of the host 208 and the other tape drives 240 (such NICs not being shown), an NIC of a network switch, etc.) may be identified by a unique identifier such as a unique World Wide Name (WWN) or the like. For instance, each NIC may be identified by a unique World Wide Node Name (WWNN) that is common to or otherwise shared by all ports on the NIC (but that is unique relative to all other WWNNs of other NICs). Furthermore, each port on a particular NIC may be identified by a particular World Wide Port Name (WWPN) that is unique relative to other ports on the particular NIC (but not necessarily relative to other ports on other NICs). The various NICs may facilitate data transfer at any appropriate speed (e.g., 2 Gbit/s, 4 Gbit/s, 8 Gbit/s, 16 Gbit/s, etc.).

The NIC 236 of the first tape drive 204 may include a plurality of ports 244, at least a first 248 of which is configured in a "target" mode to receive data transfer commands 252 from a server 256 on host 208 over one or more networks, and at least a second 260 of which is configured in an "initiator" mode to send data transfer commands 264 (e.g., write and/or read commands) to one or more other tape drives 240 (and send or read data 266 to or from one or more other tape drives 240) based on the commands 252 received from the server 256. The NIC 236 of the first tape drive 204 may also include any appropriate number of additional ports 272.

Figure 3:
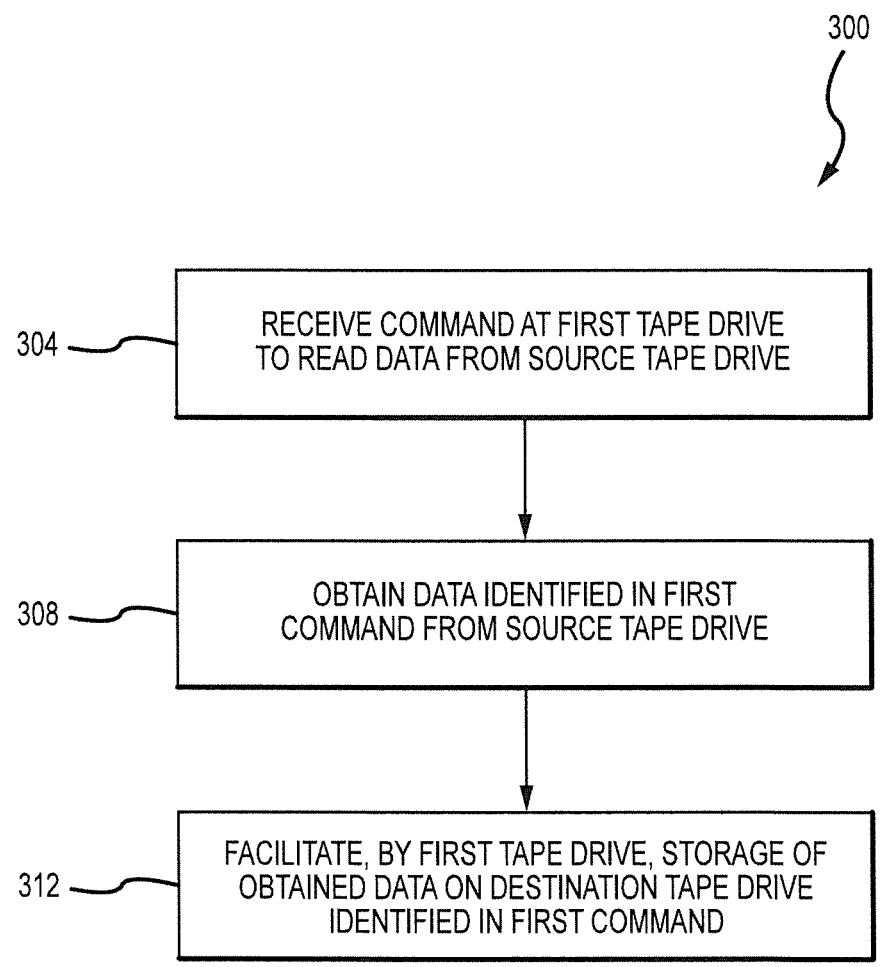
FIG. 3 is a flow diagram of a method of using a first tape drive to transfer data from at least one source tape drive to at least one destination drive over at least one network.

Turning now to FIG. 3, a flow diagram of a method 300 of using the first tape drive 204 to transfer data from at least one source tape drive to at least one destination drive over at least one network is illustrated. At 304, the first tape drive may receive 304 a command 252 from the server 256 of host device 208 via first port 248 (configured in target mode) to obtain (e.g., read) particular data from at least one source tape drive. Each command 252 may be in any appropriate format (e.g., as dictated by FC protocol (FCP) or the like) and may include any appropriate information to allow the first tape drive 204 to initiate and facilitate the particular data transfer. For instance, the command 252 may include a plurality of tape drive identifiers 276 (e.g., WWNNs or the like) that identify the particular source and destination tape drives of the particular data transfer. The command 252 may also include a plurality of data identifiers 280 that identify the particular portions (e.g., blocks) of data to be migrated or copied from the source tape drive(s) (i.e., from a tape cartridge within the source tape drive(s)) as well as the particular locations in the destination tape drive(s) (i.e., in a tape cartridge within the destination tape drive(s)) to which the data is to be migrated or copied.

Figure 6:
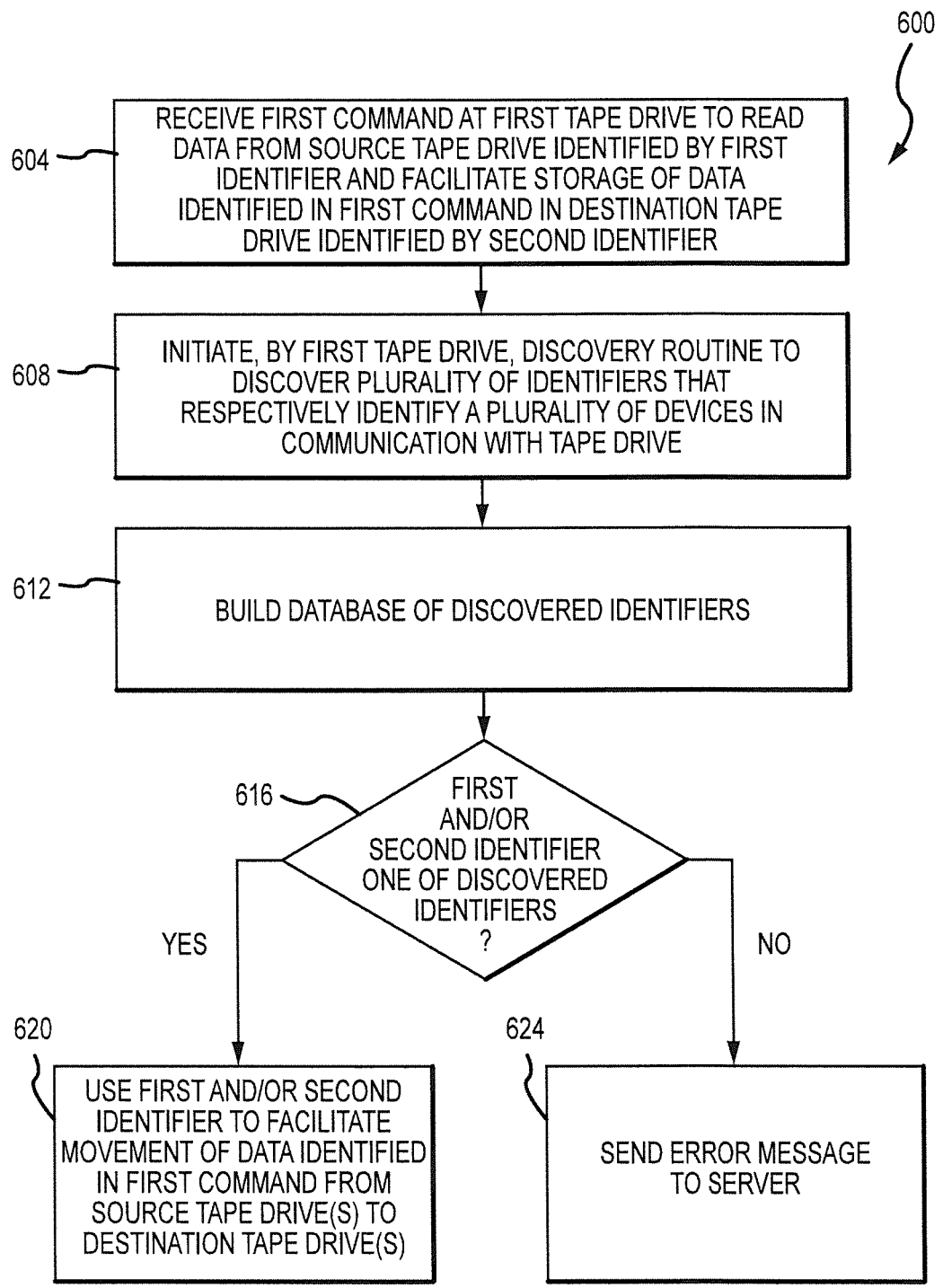
FIG. 6 is a flow diagram of a method of using a first tape drive to initiate a discovery routine of identifiers that identify devices in network communication with the first tape drive in conjunction with data transfer commands received from a host server.

Once the command 252 is received at the first tape drive 204 via the first port 248, the processor 216 may appropriately parse the command (e.g., via parser 233) to extract any appropriate information (e.g., tape drive identifiers 276, data identifiers 280 and locations, etc.) and store the same in any appropriate location (e.g., in cache/buffer) for further processing (e.g., to determine which tape drives are to be involved in the data transfer, to generate appropriate commands (e.g., via command generator 234) to be sent to one or more other tape drives 240 via second port 260 (configured in initiator mode), and the like). In one arrangement, part of the process of parsing the tape drive IDs 276 from the command 252 may be confirming that the tape drive IDs 276 identify actual tape drives that are accessible by the first tape drive 204 over one or more networks. With reference now to the method 600 of FIG. 6 and after a first command to read data from a source tape drive and facilitate storage of the data in a destination tape drive has been received 604 at the first tape drive 204, the first tape drive 204 (e.g., via the processor 216) may initiate 608 a discovery routine to discover a plurality of identifiers (e.g., WWNNs or the like) respectively identifying a plurality of tape drives accessible by (e.g., in communication with) the first tape drive 204 over one or more networks (e.g., via appropriate FCP auto-discovery process or the like).

At 612, a database of the discovered identifiers may be built (e.g., by the processor 216) in any appropriate manner and stored in any appropriate location (e.g., in cache/buffer 232 or the like) for subsequent access and processing. The method 600 may then query 616 whether each of the tape drive identifiers 276 extracted from the command 252 is one of the discovered identifiers. For instance, the processor 216 of first tape drive 204 may retrieve the database of discovered identifiers and tape drive identifiers 276 parsed from the command 252 and determine whether each of the parsed tape drive identifiers can be found in the database of discovered identifiers. In response to a negative answer to the query 616, the processor 216 of the first tape drive 204 may facilitate the sending 624 of an error message or the like back to the server 256 identifying the particular tape drive identifier(s) 276 not found during the discovery routine. In response to a positive answer to the query 616, the processor 216 may use 620 the tape drive identifiers 276 to facilitate data movement between the source and destination tape drives identified in the command 252. Returning to FIG. 3, for instance, the method 300 may then include obtaining 308 (by the first tape drive 204 of FIG. 2) the data identified in the first command 252 (e.g., with the tape drive IDs 276 and data IDs 280 of FIG. 2) from the source tape drive(s) and facilitating 312 (by the first tape drive 204) storage of the obtained data on the destination tape drive(s). The processor 216 of the first tape drive 204 may generate and send any appropriate status/result messages back to the host device 208 (which may proceed to send the same to any appropriate metadata server to update corresponding records, see metadata server 720 of FIGS. 9-13).

Figure 7:
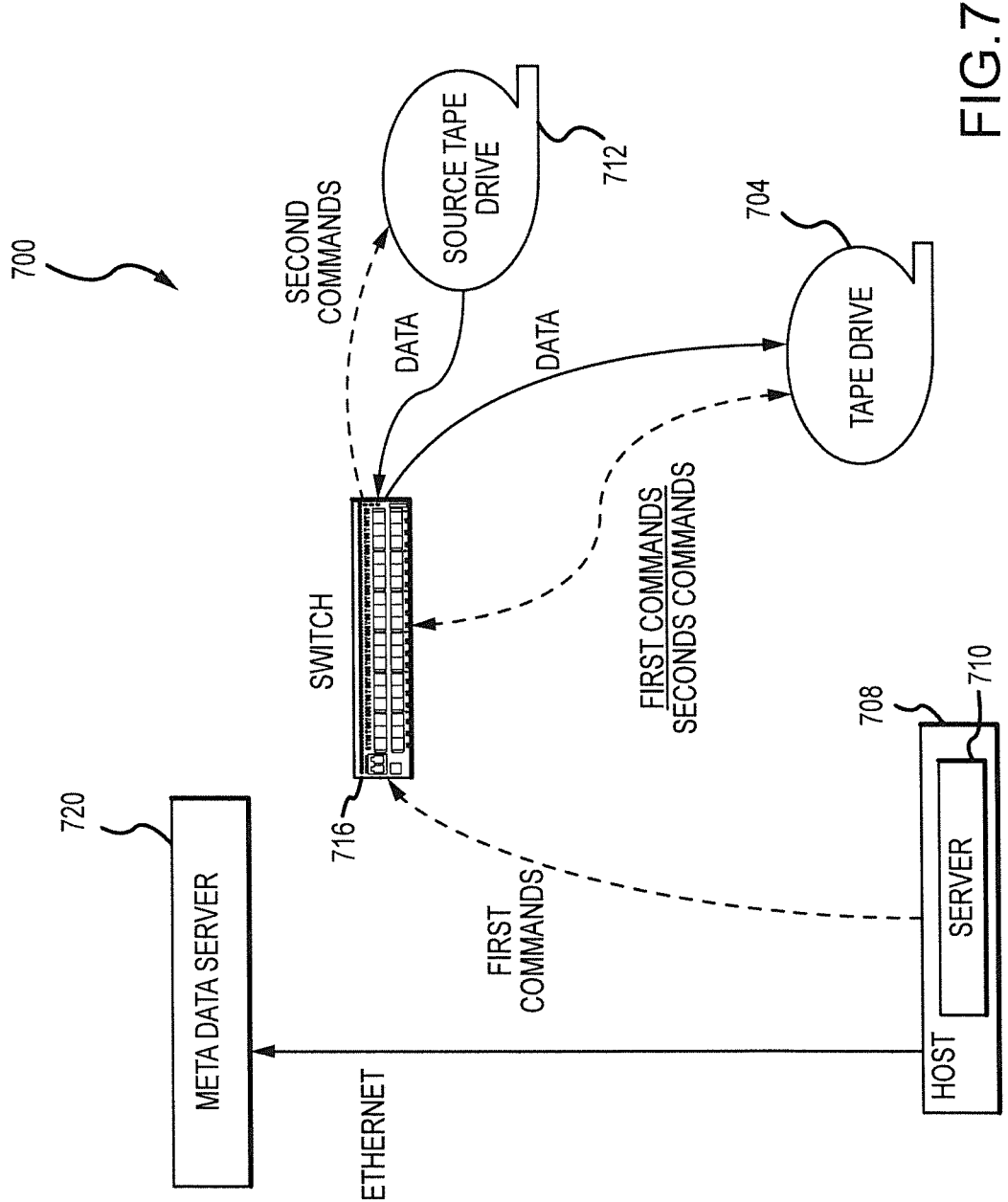
FIG. 7 is a schematic diagram of a system for data transfer from a source tape drive to a destination tape drive using the destination tape drive as the data transfer initiator according to one embodiment.

In one arrangement, the at least one source tape drive in the obtaining step 308 of FIG. 3 may be a tape drive different than the first tape drive 204 (i.e., different than the initiating tape drive). Turning now to the method 400 of FIG. 4, a first command to read data from a second tape drive may be received 404 at the first tape drive and then the processor of the first tape drive may send 408 a second command to the second tape drive to return the data identified in the first command. As an example, FIG. 7 presents a schematic diagram of a system 700 for data transfer from a second (e.g., source) tape drive 712 (e.g., one of other tape drives 240 of FIG. 2) to a first (e.g., destination) tape drive 704 (e.g., first initiating tape drive 204 of FIG. 2).

For instance, a server 710 (e.g., server 256 of FIG. 1) of host device 708 (e.g., host device 208 of FIG. 1) may access any appropriate metadata server 720 or the like (e.g., via any appropriate Ethernet connection or the like) to determine the available data on the second tape drive 712, the location of the data on the second tape drive 712 (e.g., on a tape cartridge of the second tape drive 712), the identifiers (e.g., WWNNs of the NICs of the first and second tape drives 704, 712, and/or the like. The server 710 may then generate (e.g., via a processor of the server 710 or host 708) a first command (identified by broken lines in FIG. 7, e.g., first command 252 in FIG. 2) and send the same for receipt at the port of the NIC of the first tape drive 704 that is configured in target mode (e.g., first port 248 of FIG. 2). In one arrangement, the server 710 may send the first command to a switch 716 (e.g., FC switch of any appropriate speed such as 2 GB/sec, 4 GB/sec, etc.) which may appropriately route the first command to the first tape drive 704 (based on a WWNN and/or the like). In this regard, part of the information the server 710 obtains from the metadata server 720 may be an identifier (e.g., WWNN or the like) of the switch 716.

In any case, the processor of the first tape drive 704 (e.g., processor 216 of FIG. 2) may, upon receiving 404 the first command from the server 710, appropriately parse and process the first command as discussed previously. The processor may then generate and send 408 a second command (e.g., command 264 of FIG. 2) via the port of the NIC of the first tape drive 704 that is configured in initiator mode (e.g., second port 260 of FIG. 2) to the second tape drive 712 to return the data requested in the first command to the first tape drive 704. For instance, the second command may include the identifier of the switch 716, the identifier of the second tape drive 712 (e.g., the WWNN), the requested data (e.g., tape cartridge identifier, block numbers, etc.). Upon receipt of the second command, the second tape drive 712 (e.g., in target mode) returns the data requested in the second command to the second first tape drive 704 (e.g., via switch 716 or the like).

Figure 8:
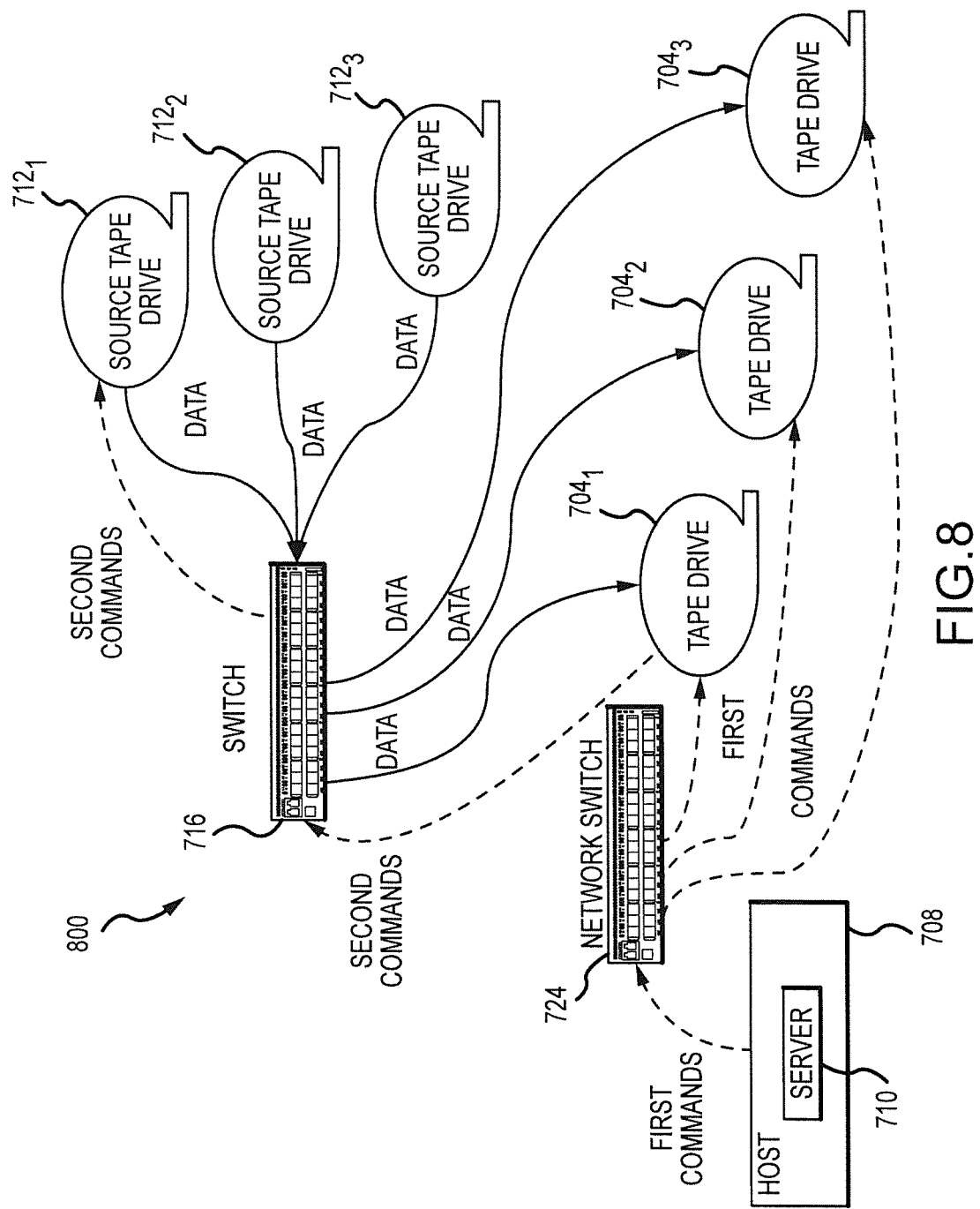
FIG. 8 is a schematic diagram of a system for data transfer from a plurality of source tape drives to a plurality of destination tape drives using the destination tape drives as the data transfer initiators.

Returning to FIG. 4, the method 400 may query 412 whether the destination tape drive is the first tape drive 704. For instance, the query 412 may include the processor of the first tape drive 704 referring to the first command received from the server 710 to determine which tape drive(s) was/were identified as the "destination" tape drive(s). In response to a positive answer to the query 412, the processor of the first tape drive 704 may facilitate storage of the returned data on the first tape drive (e.g., at any appropriate location(s) on a tape cartridge disposed in the first tape cartridge 704). In one arrangement, the server 710 may send a plurality of first commands to a respective plurality of first tape drives 704$_1$, 704$_2$, 704$_3$ to send second commands to read data from a respective plurality of second tape drives 712$_1$, 712$_2$, 712$_n$ (only second command from first tape drive 704$_1$ to second tape drive 712$_1$ shown in the interest of clarity) and store the same on first tape drives 704$_1$, 704$_2$, 704$_3$. See system 800 of FIG. 8. For instance, the first commands may be routed to the first tape drives 704$_1$, 704$_2$, 704$_3$ via a network switch 724 and the second commands and data may be routed between the first tape drives 704$_1$, 704$_2$, 704$_3$ and the second tape drives 712$_1$, 712$_2$, 712$_n$ via the switch 716.

Figure 4:
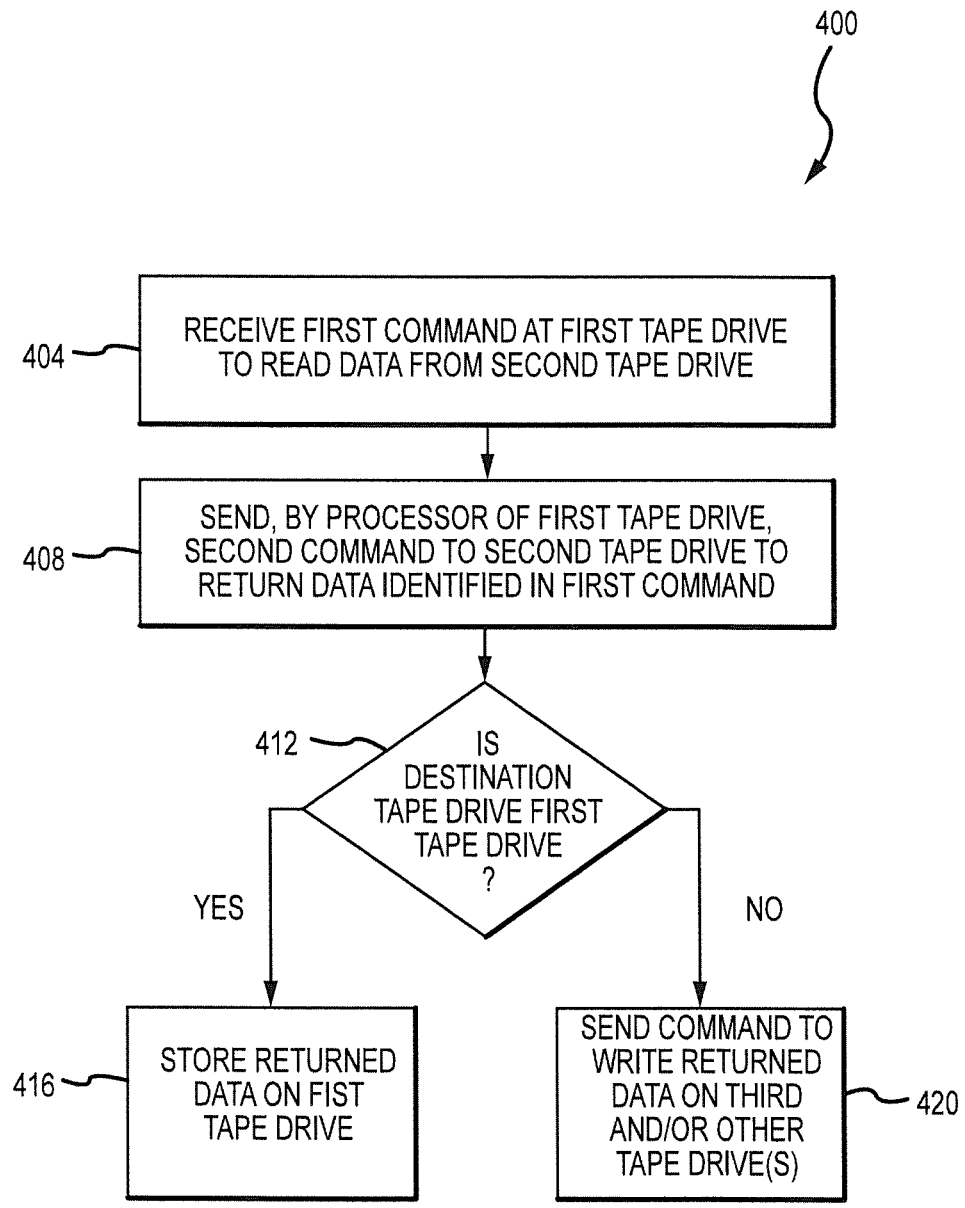
FIG. 4 is a flow diagram of a method of using a first tape drive to transfer data from at least a second tape drive to at least one destination tape drive over at least one network.

In any case, the method 400 of FIG. 4 may include, in response to a negative answer to the query 412 (which may not necessary be mutually exclusive with a positive answer to the query 412) temporarily storing the returned data (e.g., in cache/buffer 232 of FIG. 2, a disk drive in communication with the first tape drive 704, etc.) and then generating and sending 420 a command (e.g., a third command) to write the returned data to a third or additional tape drives. With reference now to the system 900 of FIG. 9, it can be seen how after receiving the data from the second tape drive 712 via the second command, the first tape drive 704 may send one or more third commands (e.g., commands 264 of FIG. 2) and corresponding data (e.g., the data returned from the second tape drive 712) to one or more third tape drives 728$_1$, 728$_2$, 728$_n$ (only third command from first tape drive 704 to third tape drive 728$_1$ has been shown in the interest of clarity) to write the corresponding data to one or more appropriate locations on the one or more third tape drives 728$_1$, 728$_2$, 728$_n$ (e.g., on tape cartridges installed in the one or more third tape drives 728$_1$, 728$_2$, 728$_n$).

Figure 10:
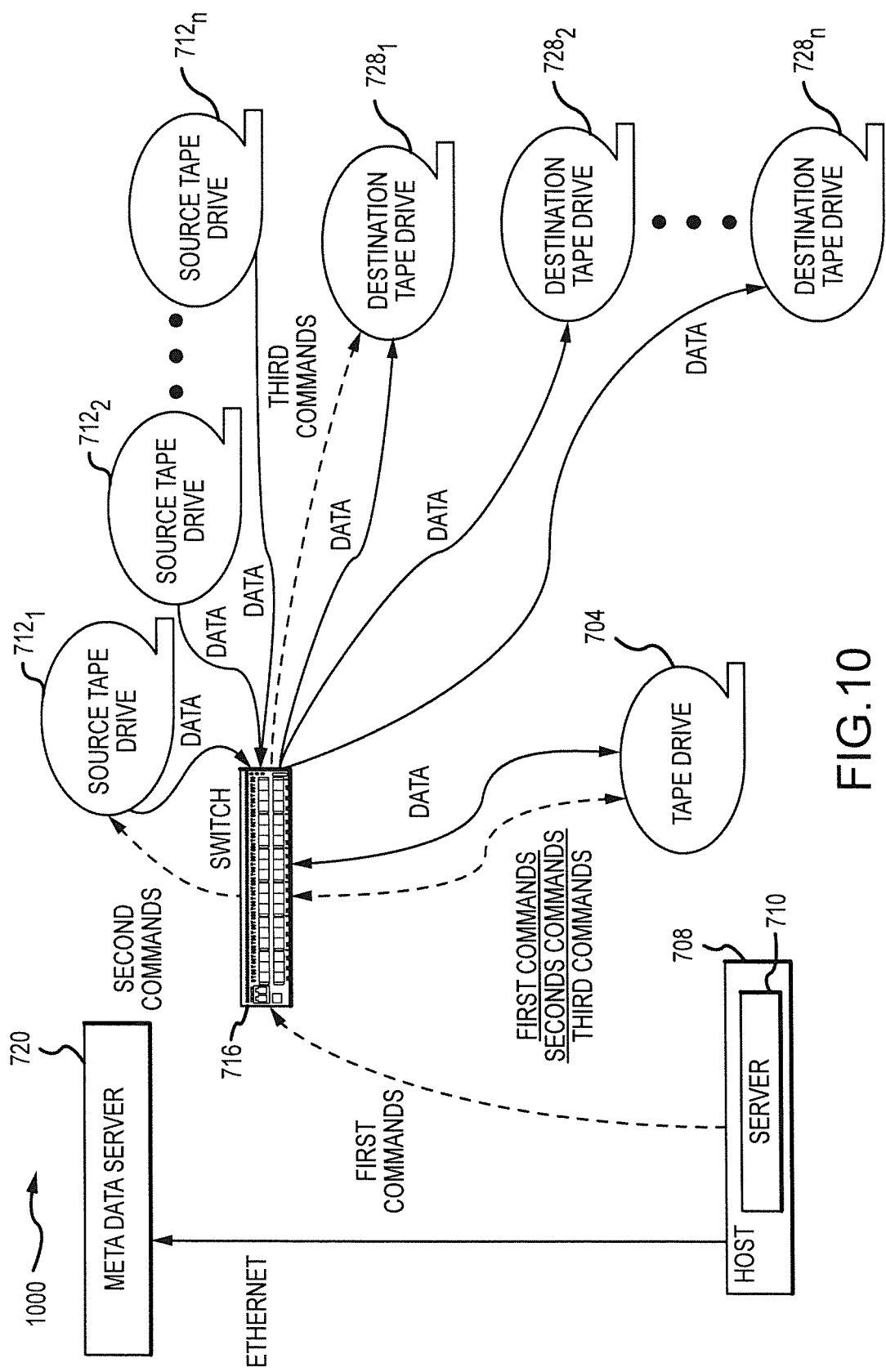
FIG. 10 is a schematic diagram of a system for data transfer from a plurality of source tape drives to a plurality of destination tape drives using an intermediate tape drive as the data transfer initiator.

In one variation as shown in the system 1000 of FIG. 10, the first command received by the first tape drive 704 may include a request to read a plurality of portions of data from a respective plurality of second tape drives 712$_1$, 712$_2$, 712$_n$ for writing to one or more third tape drives 728$_1$, 728$_2$, 728$_n$. Thus, the first tape drive 704 may generate a respective plurality of second commands to be sent to the plurality of second tape drives 712$_1$, 712$_2$, 712$_n$ to return the data identified in the first command to the first tape drive 704. Upon receipt, the first tape drive 704 temporarily stores the returned data (e.g., buffer, disk drive, etc.) before generating and sending respective third commands and the temporarily stored data to one or more third tape drives 728$_1$, 728$_2$, 728$_n$ for writing of the data to the one or more third tape drives 728$_1$, 728$_2$, 728$_n$.

While the one or more source tape drives may in some arrangements be one or more tape drives different than the first tape drive 704/204, the source tape drive may also include the first tape drive 704/204 in other arrangements. With reference now to the method 500 of FIG. 500, a first command (e.g., command 252 of FIG. 2) may be received 504 at the first tape drive to write data from the first tape drive to one or more other tape drives. As discussed previously, the processor of the first tape drive 704 (e.g., processor 216 of FIG. 2) may appropriately parse the first command to identify particular data on the tape cartridge of the first tape drive 704, the identifiers of the one or more particular destination tape drives, and the like. After obtaining 508 the data identified in the first command from a tape cartridge of the first tape drive 704, the processor of the first tape drive 704 may then generate and send 512 (via its "initiator" mode port) a second command and corresponding data (e.g., the data obtained from the tape cartridge of the first tape drive 704 as identified in the first command) to a second (destination) tape drive 732 to write the corresponding data to one or more appropriate locations on the second tape drives 732 (e.g., on a tape cartridge installed in the second tape drive 732). See system 1100 of FIG. 11. In one variation, the first tape drive 704 may generate a plurality of second commands and send the plurality of second commands and the corresponding data to a respective plurality of second tape drives 732$_1$, 732$_2$, 732$_n$ to write the data thereon. See system 1300 of FIG. 13.

In one arrangement, the data written from the first tape drive 704 to the second tape drive 732 may be a substantial reflection of data written to the first tape drive 704 from the server 710. As shown in the system 1200 of FIG. 12, for instance, the server 710 may write data from the host device 708 or from another device (e.g., disk drive, etc.) to the first tape drive 704 (e.g., via switch 716). In conjunction with the aforementioned data write, the server 710 may also send a first command to the first tape drive 704 to write the data from the first tape drive 704 to a second (destination) tape drive 732. In one variation, the first tape drive may generate second commands to write the data received from the server 710 to one or more second/destination tape drives 732 in substantial real time. For instance, upon receipt of the data from the server 710 in the cache or buffer of the first tape drive 704 (e.g., cache/buffer 232 of FIG. 2) via the target mode port (e.g., second port 260 of FIG. 2) of the first tape drive 704, the processor of the first tape drive 704 may in some arrangements be configured to simultaneously write the data to a tape cartridge (e.g., tape cartridge 224 of FIG. 2) of the first tape drive 704 as well as generate second commands and send the second command and the data to the one or more second/destination tape drives 732.

The utilities and various embodiments presented herein advantageously facilitate movement (e.g., migration, backup, etc.) of data between a plurality of tape drives of one or more networks free of having to read data from a source tape drive to a host device (e.g., disk drive associated with the host device) and then subsequently writing the data from the host device to one or more destination tape drives over one or more networks. As discussed herein, a server of a host device may send data movement control commands to a first tape drive having at least one port configured in target mode to receive the control commands and at least one port configured in initiator mode to send corresponding commands to one or more other tape drives based on the control commands received from the host device. Rather than data from the other tape drives being sent back to the host device, the data may be read directly to the first tape drive and stored thereon and/or written from the first tape drive directly to one or more other tape drives. By at least partially separating the control paths and data paths and making use of what may otherwise be underutilized processing bandwidth on the first tape drive, resources of the server (e.g., storage, server cycles, etc.) may be made available for other system processes, increased rates of data transfer between source and destination tape drives may be achieved, and overall system performance may be improved.

It will be readily appreciated that many additions and/or deviations may be made from the specific embodiments disclosed in the specification without departing from the spirit and scope of the invention. As discussed in relation to the system 800 of FIG. 8, for instance, more than one tape drive may have at least one port configured in initiator mode (e.g., each of first tape drives 7041, 7042, 7043). However, other ones of the arrangements disclosed herein may also incorporate additional "initiating" tape drives. With reference to the system 900 of FIG. 9, it is envisioned that second tape drive 712 may have at least first and second ports respectively configured in target and initiator modes. For instance, rather than the second command sent from the first tape drive 704 to the second tape drive 712 being a command to return particular data from the second tape drive 712 to the first tape drive 704, the second command could instead be a command to obtain and write the requested data directed to the one or more third tape drives 7281, 7282, 728n. In this regard, the third commands in FIG. 9 would travel from the second tape drive 712 (e.g., via its initiator mode port) to the one or more third tape drives 7281, 7282, 728n (e.g., via switch 716) rather than from the first tape drive 704 to the one or more third tape drives 7281, 7282, 728n. It will be understood that various additional more complicated arrangements of data transfer between a plurality of tape drives are envisioned and encompassed herein.

Figure 2:
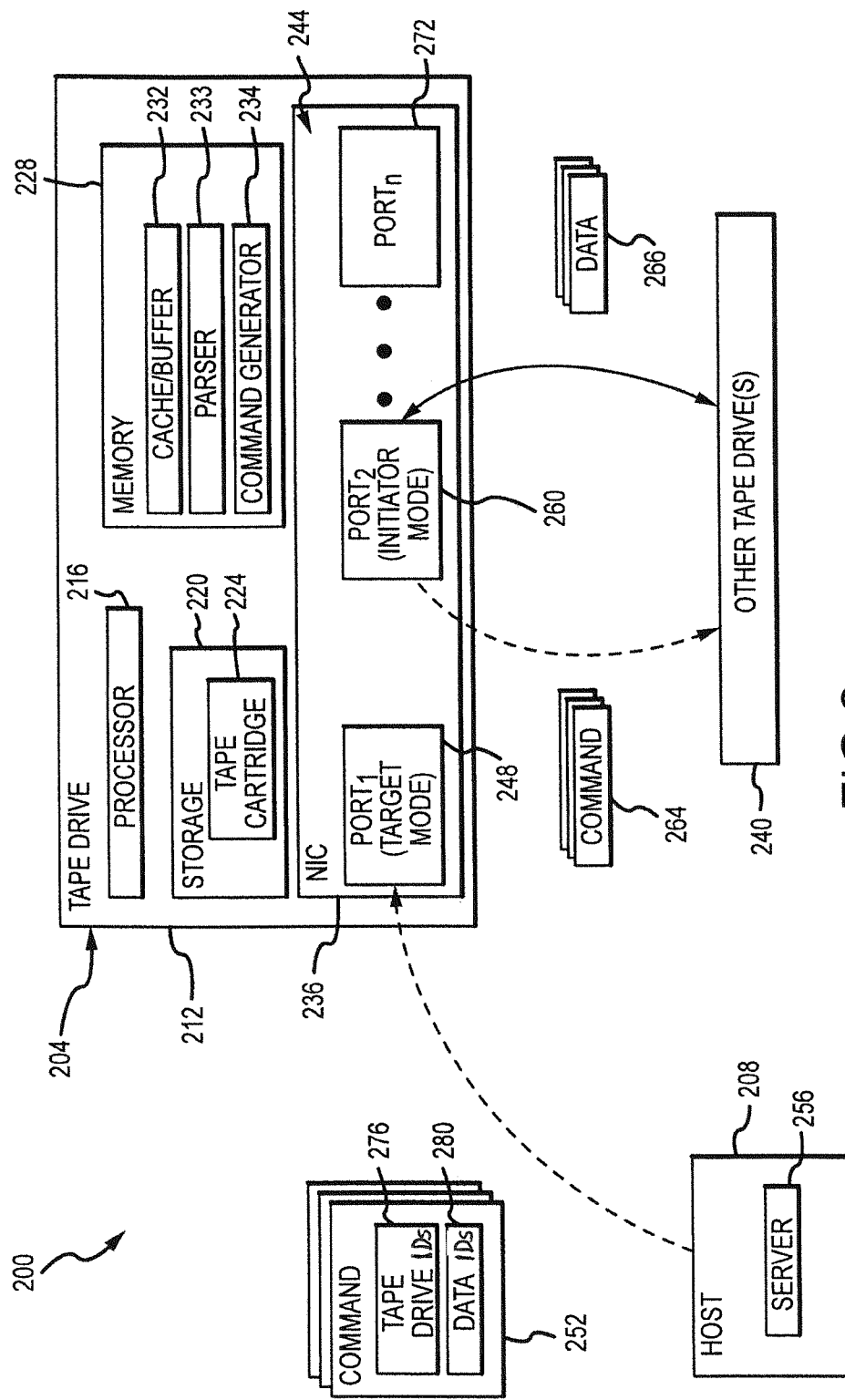
FIG. 2 is a schematic diagram of a system for data transfer between a tape drive and one or more other tape drives that utilizes the tape drive as the data transfer initiator.

Furthermore, it is not necessary that a particular tape drive operate in target mode and initiator mode via different respective ports of the tape drive. That is, target mode and initiator mode can both be configured on the same port. With reference to FIG. 2, for instance, the first port 248 could be configured in target mode to receive commands 252 from the host 208 and in initiator mode to send commands 264 to one or more other tape drives 240. In some arrangements, the first port 248 could be configured in target and initiator modes with respect to a first set of devices and the second port 260 could be configured in target and initiator modes with respect to a second set of devices that is at least partially different from the first set of devices.

Still further, the illustrations and discussion herein has only been provided to assist the reader in understanding the various aspects of the present disclosure and that one or more various combinations of the above discussed arrangements and embodiments are also envisioned. Additionally, the various uses of "first," "second," "third," etc. herein have only been provided to assist the reader in understanding the various functionalities presented herein and do not necessarily limit the scope thereof.

Embodiments disclosed herein can be implemented as one or more computer program products, i.e., one or more modules of computer program or computer-readable instructions encoded on a computer-readable medium for execution by, or to control the operation of, data processing apparatus. For example, the logic or software of the parser 233, command generator 234, etc. of the first tape drive 204 may be provided in such computer-readable medium of the first tape drive 204 and executed by the processor 216. The computer-readable medium can be a machine-readable storage device, a machine-readable storage substrate, a non-volatile memory device, a composition of matter affecting a machine-readable propagated signal, or a combination of one or more of them. The computer program products may be written in any appropriate form of programming language including compiled or interpreted languages and it can be deployed in any form including as a standalone program or as a module, component, subroutine, or other unit suitable for use in a computing environment. A computer program can be deployed to be executed on one computer or on multiple computers that are located at one site or distributed across multiple sites and interconnected by a communication network.

The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The above described embodiments including the preferred embodiment and the best mode of the invention known to the inventor at the time of filing are given by illustrative examples only.

What we claim is:

1. A tape drive, comprising:
   a housing;
   a network interface card (NIC) disposed within the housing, wherein the NIC includes:

at least one port configured in a target mode to receive first commands from a server over at least one network; and at least one port configured in an initiator mode to send second commands to other tape drives over at least one network, wherein the second commands comprise commands to at least one of return data identified in the first command from one or more other tape drives to the tape drive, or write data from the tape drive to the one or more other tape drives, wherein the at least one port configured in a target mode to receive first commands from a server over at least one network comprises a first port, and wherein the at least one port configured in an initiator mode to send second commands to other tape drives over at least one network comprises a second port; and a processor associated within the housing that receives the first commands from the server and generates the second commands based on information in the first commands.

2. The tape drive of claim 1, wherein the NIC is identified by a world wide node name (WWNN), and wherein the first and second ports are identified by different respective first and second world wide port names (WWPNs).

3. The tape drive of claim 1, wherein the processor parses the first commands to extract one or more identifiers that respectively identify the one or more other tape drives.

4. The tape drive of claim 3, wherein the processor uses the one or more identifiers to generate the second commands responsive to the processor determining that each of the one or more identifiers is present in a database of previously-discovered identifiers.

5. The tape drive of claim 3, further including a cache, wherein the processor stores the one or more extracted identifiers in the cache.

6. The tape drive of claim 5, wherein the processor generates one second command to a first of the one or more other tape drives to return particular data from the first other tape drive, and wherein the processor generates another second command to write the returned particular data to a second of the one or more other tape drives.

7. The tape drive of claim 6, wherein the processor stores the returned particular data in the cache before generation of the another second command.

8. The tape drive of claim 1, wherein the processor generates one second command to a first of the one or more other tape drives to return particular data from the first other tape drive, and wherein the processor generates another second command to write the returned particular data to a second of the one or more other tape drives.

* * * * *

UNITED STATES PATENT AND TRADEMARK OFFICE
CERTIFICATE OF CORRECTION

| | |
|---|---|
| PATENT NO. | : 11,163,685 B2 |
| APPLICATION NO. | : 14/921054 |
| DATED | : November 2, 2021 |
| INVENTOR(S) | : Hostetter et al. |

Page 1 of 1

It is certified that error appears in the above-identified patent and that said Letters Patent is hereby corrected as shown below:

In the Drawings

On sheet 4 of 13, in FIG. 4, under Reference Numeral 416, Line 2, delete "FIST" and insert -- FIRST --, therefor.

On sheet 7 of 13, in FIG. 7, Line 9, delete "SECONDS" and insert -- SECOND --, therefor.

Figure 9:
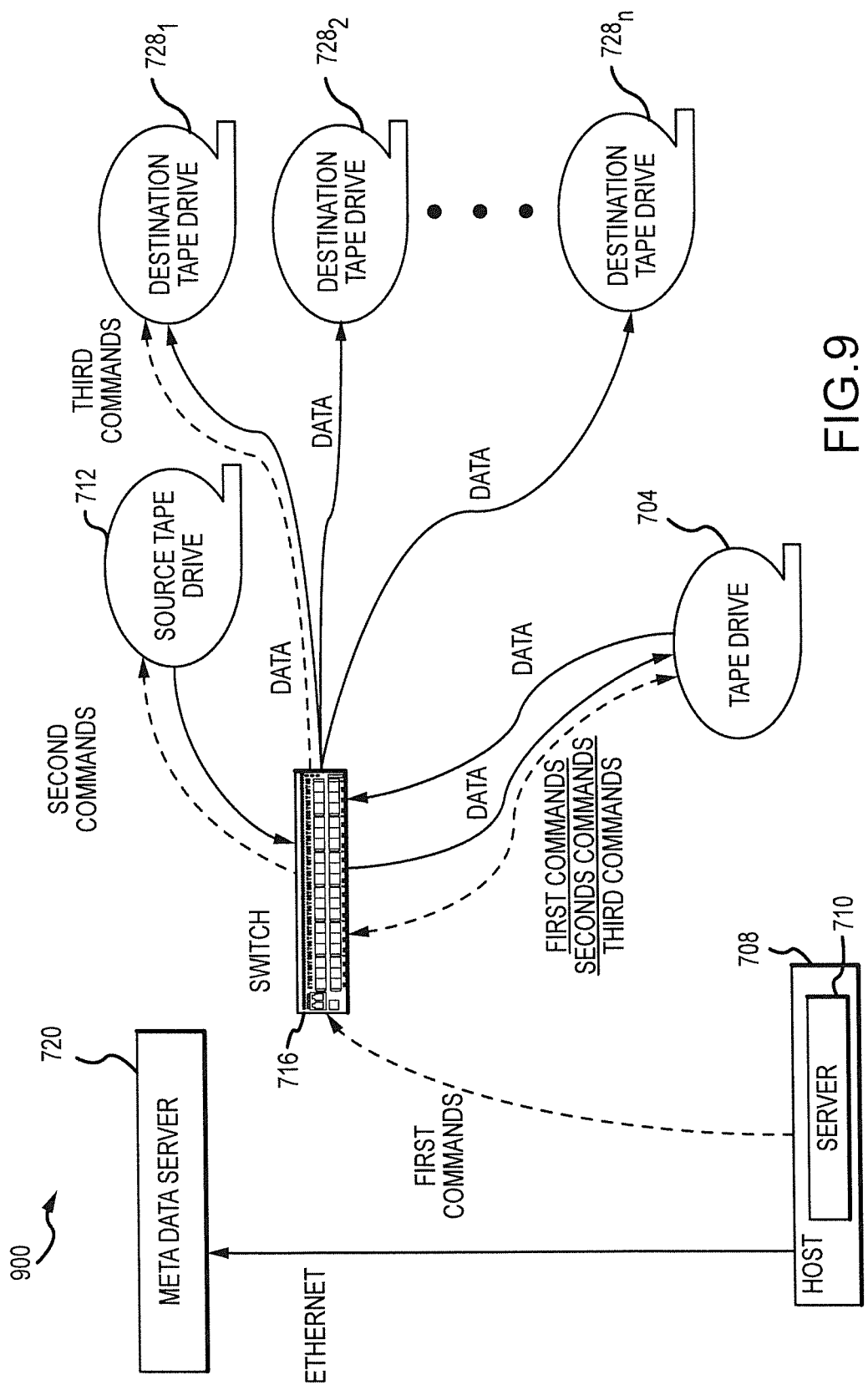
FIG. 9 is a schematic diagram of a system for data transfer from a source tape drive to a plurality of destination tape drives using an intermediate tape drive as the data transfer initiator.

On sheet 9 of 13, in FIG. 9, Line 10, delete "SECONDS" and insert -- SECOND --, therefor.

On sheet 10 of 13, in FIG. 10, Line 12, delete "SECONDS" and insert -- SECOND --, therefor.

Figure 11:
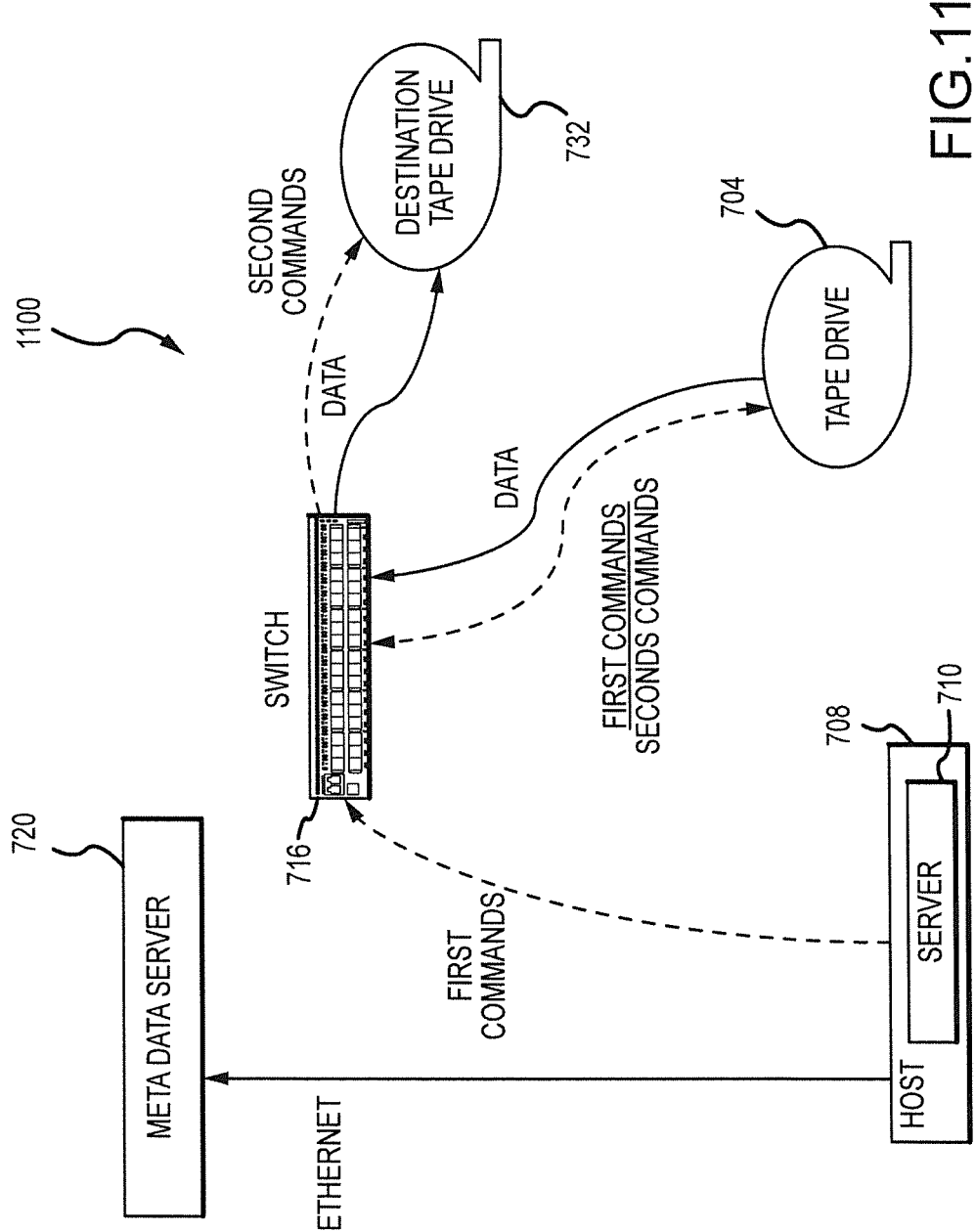
FIG. 11 is a schematic diagram of a system for data transfer from a source tape drive to a destination tape drive using the source tape drive as the data transfer initiator.

On sheet 11 of 13, in FIG. 11, Line 9, delete "SECONDS" and insert -- SECOND --, therefor.

Figure 12:
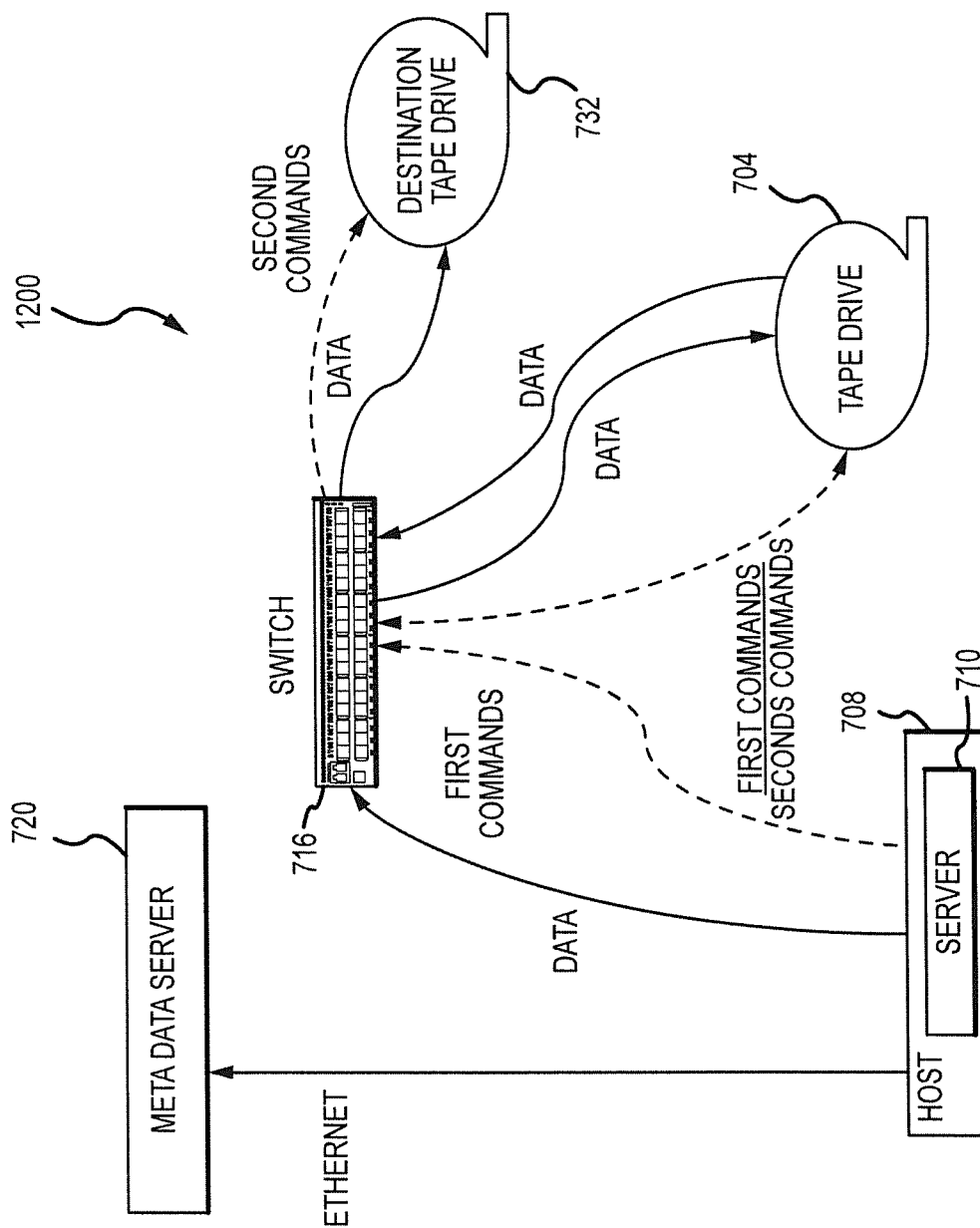
FIG. 12 is a schematic diagram of a system for data transfer similar to that in FIG. 11 but according to another embodiment.

On sheet 12 of 13, in FIG. 12, Line 10, delete "SECONDS" and insert -- SECOND --, therefor.

Figure 13:
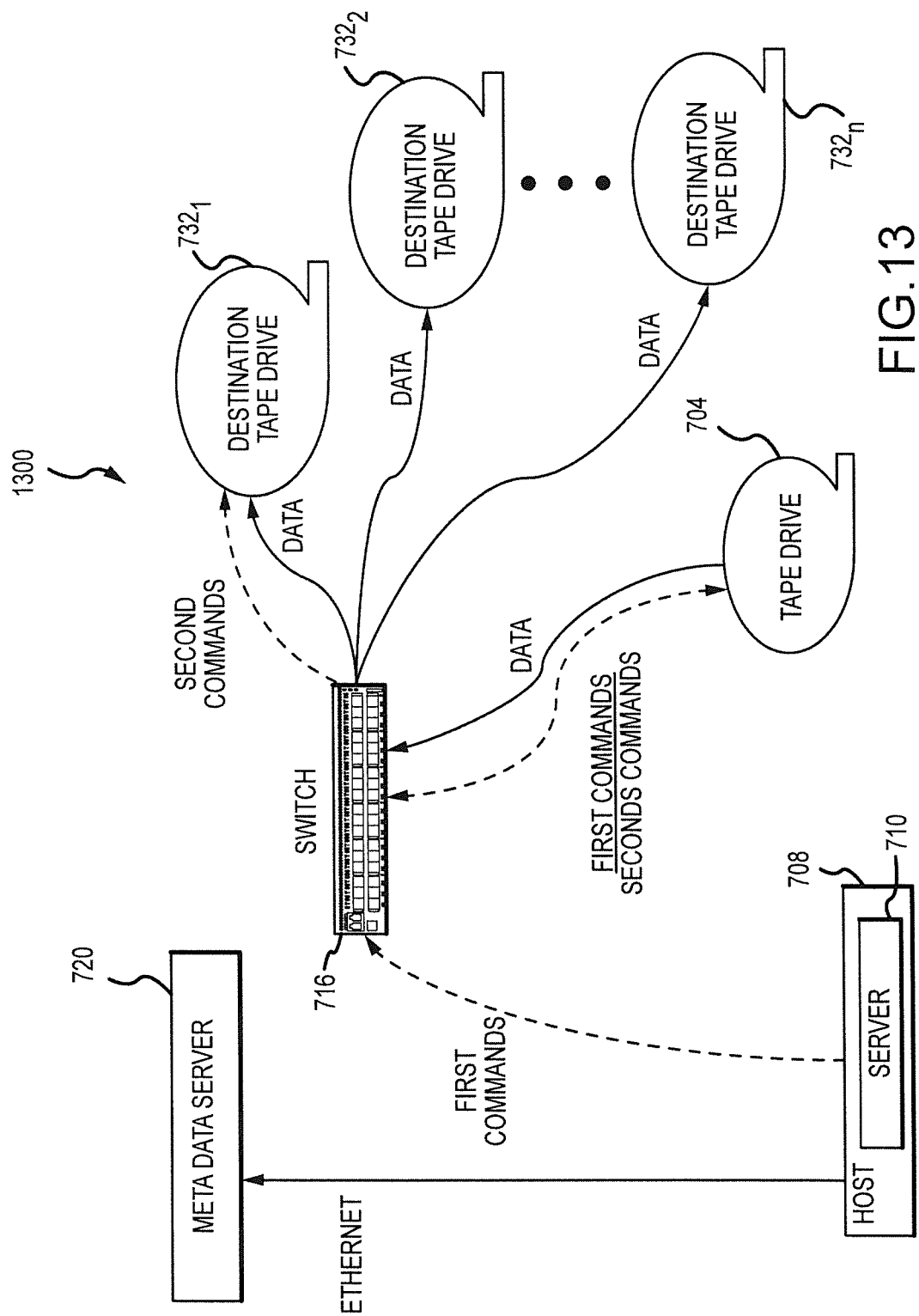
FIG. 13 is a schematic diagram of a system for data transfer from a source tape drive to a plurality of destination tape drives using the source tape drive as the data transfer initiator.

On sheet 13 of 13, in FIG. 13, Line 10, delete "SECONDS" and insert -- SECOND --, therefor.

In the Specification

Figure 5:
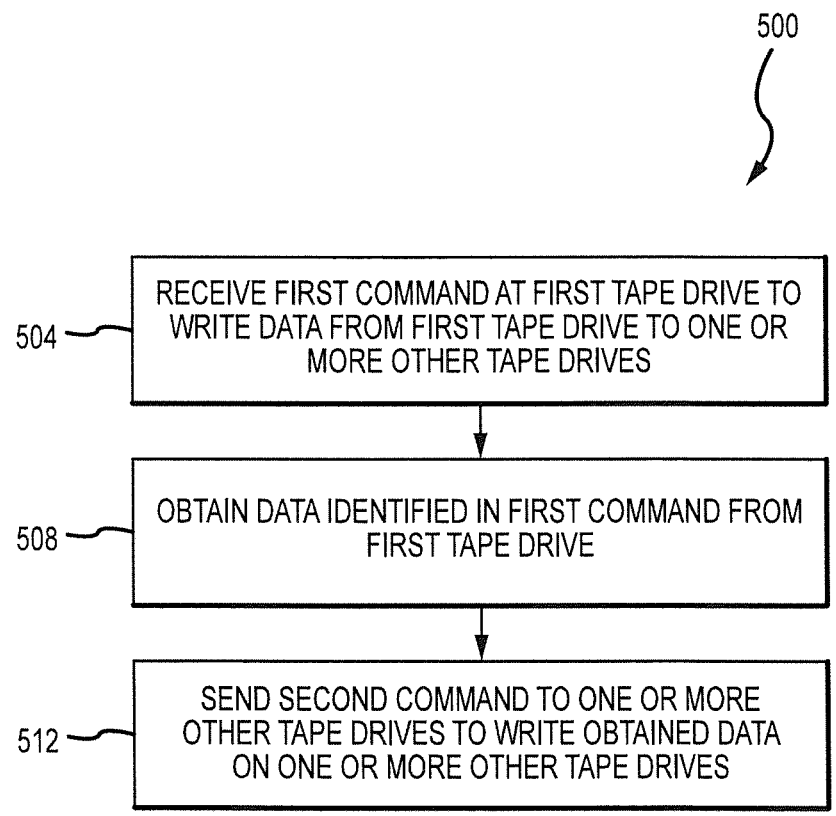
FIG. 5 is a flow diagram of a method of using a first tape drive to transfer data from the first tape drive to at least a second tape drive over at least one network.

In Column 10, Line 16, delete "FIG. 500," and insert -- FIG. 5, --, therefor.

In Column 11, Line 28, delete "7041, 7042, 7043)." and insert -- $704_1$, $704_2$, $704_3$). --, therefor.

In Column 11, Lines 39-40, delete "7281, 7282, 728n." and insert -- $728_1$, $728_2$, $728_n$. --, therefor.

In Column 11, Lines 42-43, delete "7281, 7282, 728n" and insert -- $728_1$, $728_2$, $728_n$ --, therefor.

In Column 11, Lines 44-45, delete "7281, 7282, 728n." and insert -- $728_1$, $728_2$, $728_n$. --, therefor.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*